United States Patent
Sauer et al.

(10) Patent No.: US 7,698,046 B2
(45) Date of Patent: Apr. 13, 2010

(54) PROCEDURE TO OPERATE AN INTERNAL COMBUSTION ENGINE

(75) Inventors: Christina Sauer, Benningen (DE); Andre F. Casal Kulzer, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 11/811,966

(22) Filed: Jun. 13, 2007

(65) Prior Publication Data

US 2008/0215226 A1    Sep. 4, 2008

(30) Foreign Application Priority Data

Jun. 14, 2006    (DE)    ........................ 10 2006 027 571

(51) Int. Cl.
| | |
|---|---|
| G06F 19/00 | (2006.01) |
| F02M 25/07 | (2006.01) |
| F02B 47/08 | (2006.01) |
| F02B 5/00 | (2006.01) |
| F01L 1/34 | (2006.01) |

(52) U.S. Cl. ........................ 701/103; 701/108; 123/295; 123/305; 123/568.14; 123/90.15

(58) Field of Classification Search ................. 123/295, 123/299, 300, 304, 305, 399, 431, 478, 480, 123/486, 492, 493, 568.14, 90.11, 90.15–90.18; 701/101–105, 108, 110, 111, 115

See application file for complete search history.

(56) References Cited

U.S. PATENT DOCUMENTS

| | | | | |
|---|---|---|---|---|
| 5,960,765 | A * | 10/1999 | Iida et al. ..................... | 123/295 |
| 5,967,114 | A * | 10/1999 | Yasuoka ..................... | 123/295 |
| 6,062,190 | A * | 5/2000 | Nakajima .................... | 123/295 |
| 6,244,243 | B1 * | 6/2001 | Mamiya et al. ............. | 123/295 |
| 6,260,520 | B1 | 7/2001 | Van Reatherford | |
| 6,390,054 | B1 | 5/2002 | Yang | |
| 6,752,123 | B2 * | 6/2004 | Unger et al. ................ | 123/305 |
| 6,772,585 | B2 * | 8/2004 | Iihoshi et al. ............... | 123/295 |
| 7,062,902 | B2 * | 6/2006 | Nakagawa et al. .......... | 123/299 |

FOREIGN PATENT DOCUMENTS

| | | |
|---|---|---|
| DE | 199 27 479 | 12/1999 |
| WO | WO 98/10179 | 3/1998 |

* cited by examiner

*Primary Examiner*—Willis R Wolfe, Jr.
(74) *Attorney, Agent, or Firm*—Merchant & Gould P.C.

(57) ABSTRACT

A method for the transition of a gasoline engine with direct gasoline injection and with a variable valve train assembly from an initial mode of operation to a target mode of operation, whereby the initial mode of operation and the target mode of operation are either a mode of operation with an externally-supplied ignition or a mode of operation with a self-ignition, wherein the method comprises adapting operating parameters of the initial mode of operation to required values for the target mode of operation in a map-based pilot control phase; shifting the mode of operation after the map-based pilot control phase; and controlling the operation parameters after the shift.

10 Claims, 3 Drawing Sheets

PROCEDURE TO OPERATE AN INTERNAL COMBUSTION ENGINE

Figure 1:
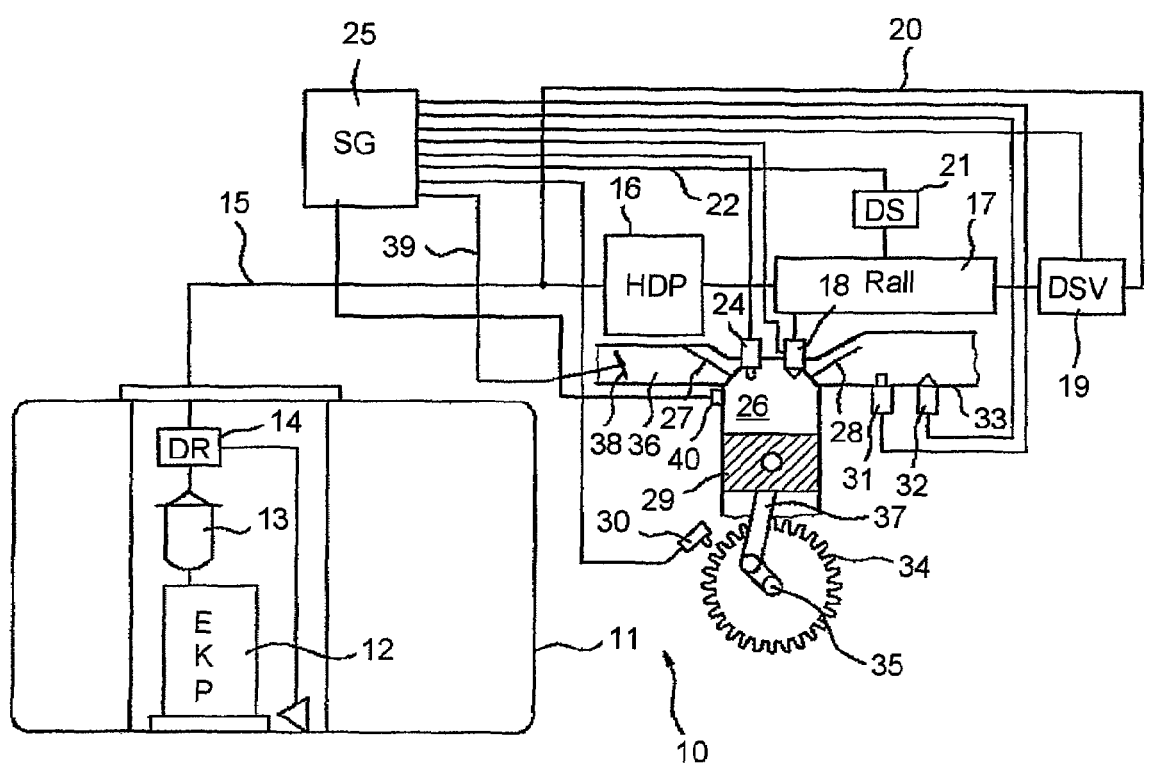

The invention at hand concerns a procedure to operate an internal combustion engine, especially a gasoline engine with direct gasoline injection, as well as a control unit and a computer program to execute the procedure.

Direct gasoline injection and variable valve-train assemblies for a gasoline engine as the internal combustion engine are state of the art. These also offer the possibility to demonstrate homogeneously powered combustion processes. On the one hand, homogeneous with externally-supplied ignition and stratified, spark-ignited combustion processes with direct fuel injection and variable valve-trains are known; on the other hand, new, homogeneous combustion processes with self-ignition are being investigated on account of their high consumption and emission potential. In connection with new, self-igniting combustion processes, the open loop/closed loop control of the self-ignition as well as the engine-map range, in which the combustion process is deployable, plays a decisive role.

In the case of the internal combustion engines with direct gasoline injection known from the state of the art, gasoline is directly injected into the combustion chamber of a cylinder of the internal combustion engine. The gasoline-air-mixture compressed in the combustion chamber is subsequently ignited by means of the ignition of an ignition spark in the combustion chamber. The volume of the ignited gasoline-air-mixture expands explosively and sets a piston moving up and down in the cylinder into motion. The reciprocating motion of the piston is transferred to a crankshaft of the internal combustion engine.

Internal combustion engines with direct fuel injection can be operated in different modes of operation. As a first mode of operation, a so-called stratification mode of operation is known, which is especially used for smaller loads. As a second mode of operation, a so-called homogenous engine mode of operation is known, which comes into use for larger loads placed on the internal combustion engine. The different modes of operations differentiate themselves with regard to the point of injection time and the duration of injection as well as the ignition timing.

During operation of an internal combustion engine in the HCCI-Mode (Homogenous Charge Compression Ignition), which is sometimes also referred to as CAI (Controlled Auto Ignition), ATAC (Active Thermo Atmosphere Combustion) or TS (Toyota Soken), the ignition of the air/fuel mixture does not take place by way of an externally-supplied ignition but by controlled self-ignition. The HCCI-combustion process can, for example, be induced by a high proportion of residual gases and/or by a high compression and/or a high intake air temperature. A precondition for the self-ignition is a sufficiently high energy level in the cylinder. Internal combustion engines operated in the HCCI-Mode are, for example known from the American U.S. Pat. No. 6,260,520, U.S. Pat. No. 6,390,054 and the German patent DE 199 27 479 and the patent WO 98/10179.

The HCCI combustion has in contrast to a conventional combustion with externally-supplied ignition the advantage of reduced fuel consumption and less toxic emissions. The closed loop control of the combustion process and especially the open loop control of the self-ignition of the mixture are, however, complex. Thus it requires a closed loop control of the control variables influencing the combustion process for, for example, the fuel injection (injection rate, respectively point of injection time and the duration of injection), internal or external exhaust gas recirculation, intake and exhaust valves (variable valve control), exhaust gas backpressure (exhaust gas valve), if need be an ignition support, intake air temperature, fuel quality and the compression ratio of the internal combustion engines with varying compression ratios.

New, homogeneous, gasoline powered combustion processes can only be used in a limited engine-map range and then only in a very well defined thermodynamic state of cylinder loading, particularly at high temperatures by means of high exhaust gas recirculation, respectively exhaust gas retention. The task of the invention at hand is to further minimize fuel consumption and emissions.

This task is solved by a procedure for the transition of a gasoline engine with direct gasoline injection and a variable valve train assembly from an initial mode of operation into a target mode of operation, whereby the initial mode of operation and the target mode of operation are either a mode of operation with an externally-supplied ignition or a mode of operation with self-ignition, whereby the procedure comprises the procedural steps for the adaptation of the operating parameters of the initial mode of operation to the values required for the target mode of operation in a map-based pilot control phase, a shift of the mode of operation after the map-based pilot control phase as well as a closed loop control of the operating parameters after the shift. The initial mode of operation is the mode of operation, from which the shift is supposed to start into another mode of operation. As a rule, a shift is hereby made from a mode of operation with externally-supplied ignition to one with self-ignition or vice versa. By a map-based pilot control phase, the time period is hereby understood to be over one or more combustion (working) cycles before the actual shift.

Provision is preferably made to compensate for too high a temperature in a combustion chamber of the internal combustion engine during a transition from a mode of operation with externally-supplied ignition to an operation with self-ignition, in that in the first working cycles after the shift, less exhaust gas is retained, respectively recirculated. This step provides for a quicker and more stable assumption of a steady-state mode of operation after the shift. Additionally provision is preferably made for a throttle valve of the internal combustion engine to open during the transition phase, in order to increase the air flow and in order that the residual gas quantity is (significantly) increased during the transition phase. While initially a temperature degradation of the gas in the combustion chamber is brought about by a reduction of the residual gas quantity, the fresh air flow is thereupon increased, which brings a further degradation of the temperature with it; and thereby or subsequently the residual gas quantity is again increased in order for an optimal temperature for the shift to be achieved. In so doing, provision is preferably made for a closed loop control of a valve train, a closed loop control of an exhaust gas recirculation, a closed loop control of a throttle valve and a closed loop control of a fuel injection to deploy with the shift in the mode of operation.

The closed loop control of the throttle valve comprises a closed loop control of the throttle valve position, which changes the fresh air mass; the closed loop control of the fuel injection comprises the closed loop control of the injected fuel quantity and the point of injection time. During the closed loop control of the exhaust gas recirculation, especially the proportion of residual gas in the gas in the combustion chamber is controlled by internal or external exhaust gas recirculation during the compression stroke. The closed loop control of the valve train comprises especially a closed loop control of the opening point in time and closing point in time of the intake and exhaust valves.

Additionally provision is preferably made in a transition from a mode of operation with self-ignition to one with a mode of operation with an externally-supplied ignition for the residual gas proportion in the cylinder to preferably be minimized to values typical of an externally-supplied ignition (approximately 10%-35%) during the map-based pilot control phase and/or transition phase. Provision can thereby be made for the throttle valve to close during the map-based pilot control phase.

Preferably provision is made for a closed loop control of a valve train, a closed loop control of an exhaust gas recirculation, a closed loop control of a throttle valve, a closed loop control of an ignition and a closed loop control of a fuel injection to deploy with the shift in the mode of operation. The closed loop control for the new mode of operation is activated with the point in time of the shift. A shift is thus made from a closed loop controlled mode of the transition phase to a closed loop controlled mode of the new mode of operation.

Provision is preferably made for the closed loop controls to be cycle-synchronous after the shift. By cycle-synchronous, a closed loop control is especially understood here, in which the parameters to be controlled are in each case regulated for one individual cycle (work cycle) to respectively work cycle specific, established set points.

The problem mentioned at the beginning of the application is also solved by means of a control unit with means to control a gasoline engine with direct gasoline injection with a variable valve train from an initial mode of operation to a target mode of operation, whereby the initial mode of operation and the target mode of operation are either a mode of operation with externally-supplied ignition or one with self-ignition, whereby the control unit comprises in a map-based pilot control phase means to adapt the operating parameters of the initial mode of operation to the values required for the target mode of operation, means to shift the mode of operation after the map-based pilot control and means for the closed loop control of the operating parameters after the shift.

The problem mentioned at the beginning of the application is also solved by a computer program with a program code to implement all of the steps in accordance with a procedure according to the invention, if the program is executed on a computer, particularly in a control unit.

Figure 2:
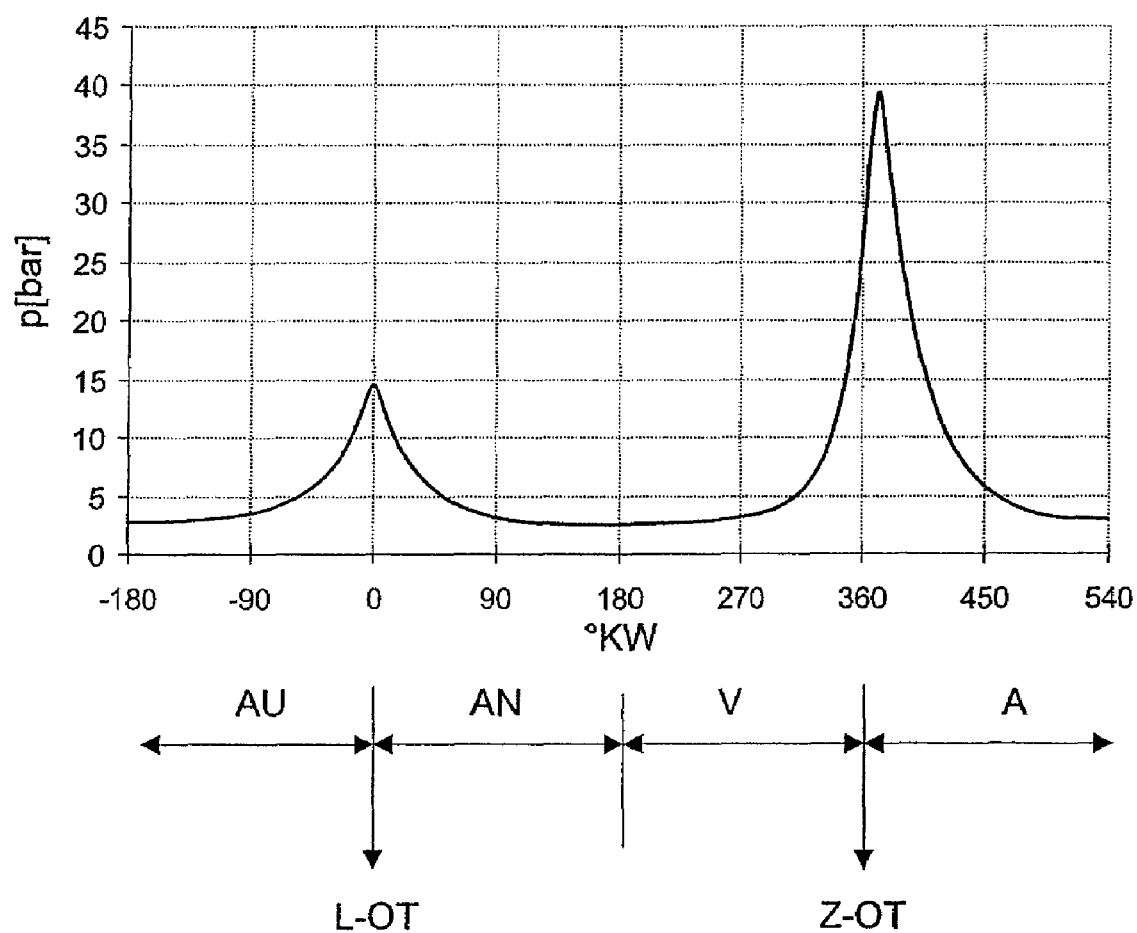
Figure 3:
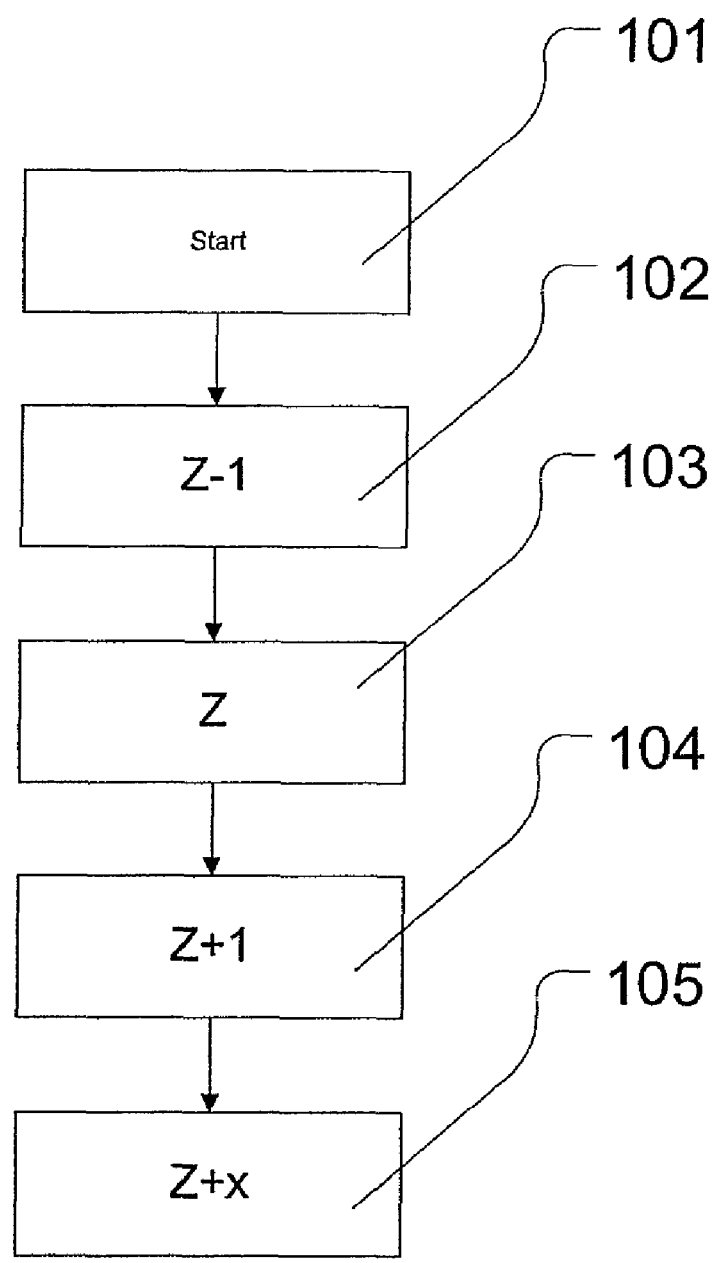

Subsequently an example of embodiment of the invention at hand will be explained in detail using the accompanying drawings. In so doing, the following are shown:

FIG. 1: a schematical depiction of a cylinder of an internal combustion engine with a fuel supply system;

FIG. 2: a diagram of combustion chamber pressure plotted against the crankshaft angle;

FIG. 3: a flow diagram of an example of embodiment of the procedure according to the invention.

FIG. 1 shows a schematical depiction of a cylinder of an internal combustion engine with accompanying components of the fuel supply system. An internal combustion engine with direct fuel injection (gasoline engine with direct gasoline injection BDE) and with a fuel tank 11, at which an electric fuel pump (EKP) 12, a fuel filter 13 and a low pressure controller 14 are disposed, is depicted as an example. A fuel line 15 leads from the fuel tank 11 to a high pressure pump 16. A storage chamber 17 adjoins itself to the high pressure pump 16. Injection valves 18 are disposed at the storage chamber 17. They are preferably assigned to combustion chambers 26 of the internal combustion engine. In the case of internal combustion engines with direct fuel injection, at least one intake valve 18 is assigned to each combustion chamber 26. Provision, however, also can be made here for several intake valves 18 for each combustion chamber 26. The fuel is transported by the electric fuel pump 12 out of the fuel tank 11 and via the fuel filter 13 and the fuel line 15 to the high pressure pump 16. The fuel filter 13 has the task of removing foreign particles out of the fuel. With the aid of the low pressure controller 14, the fuel pressure is controlled with a closed loop control in a low pressure area of the fuel supply system to a predetermined value, which for the most part lies in the order of magnitude from approximately 4 to 5 bar. The high pressure pump 16, which preferably is driven directly by the internal combustion engine, compresses the fuel and transports it to the storage chamber 17. The fuel pressure achieves in the process values up to approximately 150 bar. In FIG. 1 a combustion chamber 26 of an internal combustion engine with direct fuel injection is depicted as an example. Generally the internal combustion engine has several cylinders with a combustion chamber 26 in each of them. At least one injection valve 18, at least one spark plug 24, at least one intake valve 27 and at least one exhaust valve 28 are disposed at the combustion chamber 26. The combustion chamber is restricted by a piston 29, which can slide up and down in the cylinder. By way of the intake valve 27, fresh air from the intake duct 36 is drawn into the combustion chamber 26. With the aid of the injection valve 18, the fuel is injected directly into the combustion chamber 26 of the internal combustion engine. The fuel is ignited by the spark plug 24, provided that a mode of operation with an externally-supplied ignition exists. By the expansion of the ignited fuel, the piston 29 is driven. The motion of the piston 29 is transferred by means of a connecting rod 37 to a crankshaft 35. A segmented disk 34, which is swept by an engine rotational speed sensor 30, is disposed on the crankshaft 35. The engine rotational speed sensor 30 produces a signal, which characterizes the rotational motion of the crankshaft 35.

The exhaust gases emerging during combustion move by way of the exhaust valve 28 out of the combustion chamber 26 to an exhaust gas pipe 33, in which a temperature sensor 31 and a lambda probe 32 are disposed. With the aid of the temperature sensor 31, the temperature is acquired; and with the aid of the lambda probe 32, the oxygen content of the exhaust gases is acquired.

A pressure sensor 21 and a pressure control valve 19 are connected to a storage chamber 17. The pressure sensor valve 19 is connected to the storage chamber 17 on the input side. On the output side a backflow line 20 leads to the fuel line 15.

Instead of a pressure control valve 19, a quantity control valve can be used in the fuel supply system 10. With the aid of the pressure sensor 21, the actual value of the fuel pressure in the storage chamber 17 is acquired and delivered to a control unit 25. By way of the control unit 25, an activation signal is formed on the basis of the acquired actual value of the fuel pressure. With this activation signal, the pressure control valve is activated. The injection valves 18 are activated by way of unspecified output stages, which can be disposed inside or outside of the control unit 25. The different actuators and sensors are connected to the control unit 25 by way of control signal lines 22. In the control unit 25, different modes of operation are implemented, which serve the control system of the internal combustion engine. In modern control units, these modes of operation are programmed on a data processor and subsequently deposited in a memory of the control unit 25. The modes of operation deposited in the memory are activated as a function of the demands placed on the internal combustion engine. In so doing, especially strict demands are placed on the realtime capability of the control unit 25. In principle a pure hardware implementation of the control system of the internal combustion engine is possible as an alternative to a software implementation.

A butterfly valve 38 is disposed in the air intake system 36. The valve's rotational position is adjustable by way of the control unit 25 via a signal line 39 and an accompanying, unspecified electrical actuator.

An additional ignition mechanism 40 can be disposed at the combustion chamber. It can be in this instance an additional spark plug supplementary to the spark plug 24 or, for example, a laser or something similar. With the additional ignition mechanism 40 or with the spark plug 24, the subsequently described externally-supplied ignition is disengaged in order to bring about the self-ignition. The additional ignition mechanism 40 is controlled in an open loop by the control unit 25 and is for that purpose electrically connected to it.

In a first mode of operation, homogeneous engine mode of operation of the internal combustion engine, the throttle valve 38 is partially open, respectively closed, as a function of the desired air mass to be supplied. The fuel is injected by the injection valve 18 into the combustion chamber 26 during an intake stroke caused by the piston 29. By means of the air being simultaneously drawn into the chamber, the injected fuel is swirled and, therefore, essentially equally/homogeneously distributed in the combustion chamber 26. Subsequently the fuel-air-mixture is compressed during the compression stroke, in which the volume of the combustion chamber 26 is reduced by the piston 29, so that as a rule the mixture is ignited by the spark plug 24 shortly before the piston 29 reaches top dead center.

In a second mode of operation, the stratification mode of operation of the internal combustion engine, the throttle valve 38 is opened wide. The fuel is injected by the injection valve 18 into the combustion chamber 26 during an intake stroke caused by the piston 29. Then as before the fuel is ignited with the aid of the spark plug 24, so that the piston is driven in the now ensuing work phase by the expansion of the ignited fuel. An additional possible mode of operation is the homogeneous, lean mode of operation, in which fuel is injected into the combustion chamber 26 as during the intake phase in the homogeneous engine mode of operation.

FIG. 2 shows a diagram of the compression chamber pressure in the compression chamber 26 of the internal combustion engine plotted against the crankshaft angle in degrees of the crankshaft (° KW). A crankshaft angle of −180° to 540° is depicted above the ordinate, the combustion chamber pressure in bar is entered above the abscissa. At 0°, top dead center in the gas-exchange cycle L-OT is selected. The gas-exchange cycle provides in a known manner for the discharge of combusted exhaust gases, which takes place at −180° to 0° of the crankshaft angle; and the intake of fresh ambient air, respectively a fuel-air-mixture, takes place in this instance at the crankshaft angle range of 0-180°. With regard to the pressure progression and the valve lift progression depicted in FIG. 2, typical progressions for the controlled self-ignition are the topic of concern. The exhaust valve closes long before the L-OT, so that a greater residual gas proportion remains in the combustion chamber, which is compressed during the LW-stroke. The intake valve first opens, if pressure equilibrium again prevails between the intake manifold and the combustion chamber. At a crankshaft revolution further, at a crankshaft angle of 360°, top dead center of the ignition (ignition-OT) is achieved. The compression stroke in FIG. 2 takes place between 180° of crankshaft angle and 360° of crankshaft angle. Between 360° of crankshaft angle and 540° of crankshaft angle, the expansion of the combusting gases takes place. The individual strokes are designated in FIG. 2 with discharge AU from −180° until 0°, intake AN from 0° until 180°, compression stroke (compression) V from 180° until 360° and expansion (combustion) E from 360° until 540°. During the compression stroke, the air, respectively fuel-air-mixture or fuel-air-exhaust gas-mixture is compressed and thereby heated. The mixture as a rule is ignited shortly before reaching ignition top dead center. This can result as is common in gasoline engines by means of an externally-supplied ignition or in accordance with the mode of operation according to the invention by means of a controlled self-ignition. The ignition of the mixture leads in a known fashion and manner to a pressure increase, which is converted into mechanical energy in the immediately subsequent work cycle.

In the mode of operation of the controlled self-ignition, the injection occurs already in the gas-exchange cycle and the self-ignition (refer to FIG. 2) shortly before the achievement of the ignition top dead center. For that reason it is required for the gas-air-fuel-exhaust gas-mixture to have a sufficient ignition temperature.

Implementation of a cylinder deenergization with the controlled self-ignition of a gasoline engine is very sensitive because the thermodynamic conditions, which are required for the self-ignition, must be very exactly set. If need be, the aid of a closed loop control is required here, which corrects a map-based pilot control.

With the aid of tables 1 and 2, examples of embodiment of shifting strategies for the shift from an initial mode of operation to a target mode of operation are explained. The initial mode of operation can be an externally-supplied ignition or a self-ignition, likewise the target mode of operation can be an externally-supplied ignition or a self-ignition.

Example

Throttled Externally-Supplied Ignition to a Self-Ignition

With a mode of operation with externally-supplied ignition, a higher exhaust gas temperature, respectively exhaust gas enthalpy, is produced than with a mode of operation with self-ignition. This is taken into account in the shifting process from an externally-supplied ignition to a self-ignition, in that during a short transition phase, for example, between 5 and 10 work cycles, initially less residual gas is retained, respectively recirculated, in order to set the desired temperature, respectively enthalpy of the gas, in the cylinder for the self-ignition. The residual gas quantity required for the self-ignition can be recirculated by way of a variable valve train assembly (for example shiftable cam shafts, a completely variable valve train assembly or other variable valve train systems) and/or by way of an external exhaust gas recirculation (AGR), which can be conditioned (The gas is cooled or tempered.). During the transition phase, besides a defined increase in the residual gas quantity, the throttle valve 38 must open simultaneously by means of a closed loop or open loop control, in order that the required quantity of air moves into the cylinder. In order that the transition results with as little effect on the torque as possible, the charge (injection quantity) as well as the point of injection time must be individually targeted by a closed loop control in order to achieve the desired self-ignition timing. The load is regulated in the self-ignition operation basically by means of the fuel quantity injected, respectively fuel mass, whereas the combustion position (ignition timing) is controlled in a close loop by means of a targeted setting of the mixture between the residual gas mass and the fresh air mass and by way of the point of injection time. The shifting process is represented in a summarized form using table 1.

TABLE 1

Shift from a throttled externally-supplied ignition to a self-ignition from cycle Z forward

| Cycle | Combustion process | Transition-closed loop control |
|---|---|---|
| ... | externally-supplied ignition | no |
| Z – 1 | externally-supplied ignition | no |
| Z | self-ignition | Shift valve train assembly, closed loop control of AGR, throttle valve and fuel injection |
| Z + 1 | self-ignition | Closed loop control of valve train assembly, AGR, throttle valve and fuel injection |
| ... | self-ignition | Closed loop control of valve train assembly, AGR, throttle valve and fuel injection |
| Z + x | self-ignition | End of transition |
| ... | self-ignition | no (only closed loop control of self-ignition) | x = 5-10 cycles (for example)

Z designates thereby in each case a combustion cycle, also designated as an operation cycle, in which then a work cycle, i.e. an ignition of ignitable mixture by externally-supplied ignition or self-ignition, results. In so doing, the work cycles are counted by the shift of the valve train assembly to the work cycle Z. Work cycles, which have previously taken place, are counted with Z–1, Z–2 etc., work cycles, which take place after the shift, are counted with Z+1 up to Z+x. After the shift of the valve train assembly in the work cycle Z, the cycle-true, closed loop control of the operating parameters begins. These include the exhaust control, the position of the throttle valve as well as the fuel injection and are maintained up until the work cycle Z+x, whereby x can be x=5 up to x=10 cycles. After this transition phase, the mode of operation for self-ignition is achieved, so that operation is transferred over to a closed loop control mode for the mode of operation of the self-ignition. A transitional closed loop control, therefore, takes place between the work cycles (combustion cycles) Z and Z+x.

The closed loop control of the valve train assembly, the closed loop control of the exhaust gas recirculation, the closed loop control of the throttle valve position and the closed loop control of the fuel injection, which includes both a closed loop control of the injected fuel quantity as well as also the point of injection time, result cycle-synchronously. Thus, a closed loop control takes place for each individual combustion cycle of each individual cylinder. The closed loop control, therefore, does not occur in such a way, that the values to be controlled are maintained as constant as possible over several combustion cycles, but are varied as much as necessary from combustion cycle to combustion cycle. The cycle-synchronous closed loop control is thus a control, which intervenes in the operating parameters of each individual combustion cycle and if need be changes them.

Example

Transition from Self-Ignition to a Throttled Externally-Supplied Ignition

In the mode of operation of the self-ignition, a lower exhaust gas temperature is generated as in the mode of operation with an externally-supplied ignition. This can lead to higher emissions during the shift; hence, an optimal mixture formation is necessary in this phase. During the shift, the proportion of residual gas in the cylinder is minimized by way of the variable valve train assembly and/or by way of the external exhaust gas recirculation, in order to stably configure the combustion by means of an externally-supplied ignition. In so doing, the throttle valve is simultaneously closed via a closed loop control, so that only the required quantity of air moves into the cylinder. Beside the cylinder charge (injected quantity, respectively injected mass) the ignition timing and the injection point of time are also specifically controlled in a closed loop, in order to produce the desired torque. In this instance, a combination of a map-based pilot control with a cycle-synchronous closed loop control is advantageous as in the previously mentioned example. The procedure of the shift is explained using Table 2.

TABLE 2

Shift from self-ignition to an externally-supplied ignition, which is throttled from the combustion cycle Z forward

| Cycle | Combustion Process | Transitional Closed Loop Control |
|---|---|---|
| ... | self-ignition | no (only closed loop control of self-ignition) |
| Z – 1 | self-ignition | no (only closed loop control of self-ignition) |
| Z | externally-supplied ignition | Shift of valve train assembly, AGR, throttle valve, ignition and fuel injection |
| Z + 1 | externally-supplied ignition | Closed loop control of valve train assembly, AGR, throttle valve, ignition and fuel injection |
| ... | externally-supplied ignition | Closed loop control of valve train assembly, AGR, throttle valve, ignition and fuel injection |
| Z + x | externally-supplied ignition | End of transition |
| ... | externally-supplied ignition | no (contingent closed loop control of combustion) | x = 5-10 combustion cycles (for example)

Example

Shift Between Non-Throttled Externally-Supplied Ignition and Self-Ignition

During the transition from non-throttled mode of operation with an externally-supplied ignition to a self-ignition mode of operation and back, the closed loop control strategy is similar to the previously depicted examples of embodiment. Due to the dethrottling in the case of the non-throttled externally-supplied ignition, a closed loop control of the throttle valve is omitted, at least far enough so that the shifting process is simplified. A closed loop control of the fuel injection, ignition, internal, respectively external exhaust gas recirculation is, however, required here.

Example

Transition from a 2-Stroke Operation with Self-Ignition to a 4-Stroke Operation with Self-Ignition and Vice Versa The 2-stroke operation of a gasoline engine requires a completely variable valve train assembly, for example electrohydraulic or electromechanical valve control. The shift is thereby similarly implemented as the shift between a non-throttled externally-supplied ignition and the self-ignition of the example of embodiment previously mentioned. In this case, only the valve train assembly, the exhaust gas recirculation and the fuel injection have to be controlled in a closed loop.

FIG. 3 shows a flow diagram of an example of embodiment of the procedure according to the invention for the example of the transition from a throttled externally-supplied ignition to a self-ignition. The procedure begins in the throttled operation with an externally-supplied ignition at step 101. In step 102, which corresponds to the combustion cycle Z−1 in table 1, the mode of operation of the self-ignition continues to take place. In step 103, which corresponds to the combustion cycle Z in table 1, the self-ignition is bypassed. Therefore, a shift of the valve train assembly, a closed loop control of the exhaust gas recirculation and the throttle valve as well as the fuel injection take place. In step 104, which corresponds to the combustion cycle Z+1 as well as to the subsequent cycles in table 1, a cycle-true closed loop control of the valve train assembly, exhaust gas control butterfly valve, throttle valve and fuel injection take place. The procedure ends in step 105, which corresponds to the cycle Z+x in table 1.

The invention claimed is:

1. A control unit that controls a transition of a gasoline engine with direct gasoline injection and with a variable valve train assembly from an initial mode of operation to a target mode of operation, whereby the initial mode of operation and the target mode of operation are either a mode of operation with an externally-supplied ignition or a mode of operation with self-ignition, the control unit adaptating at least one exhaust gas recirculation and valve drive of the initial mode of operation to required values for the target mode of operation in a map-based pilot control phase, shifting a mode of operation after the map-based pilot control phase, and controlling in a closed loop the at least one exhaust gas recirculation and valve drive after shifting.

2. A computer program with program code to implement a transition of a gasoline engine with direct gasoline injection and with a variable valve train assembly from an initial mode of operation to a target mode of operation, whereby the initial mode of operation and the target mode of operation are either a mode of operation with an externally-supplied ignition or a mode of operation with a self-ignition, wherein the computer program includes instructions, to execute on a computer, for adaptating at least one exhaust gas recirculation and valve drive of the initial mode of operation to required values for the target mode of operation in a map-based pilot control phase, shifting the mode of operation after the map-based pilot control phase, and controlling the at least one exhaust gas recirculation and valve drive after the shift.

3. A method for the transition of a gasoline engine with direct gasoline injection and with a variable valve train assembly from an initial mode of operation to a target mode of operation, whereby the initial mode of operation and the target mode of operation are either a mode of operation with an externally-supplied ignition or a mode of operation with a self-ignition, wherein the method comprises:
adaptating at least one exhaust gas recirculation and valve drive of the initial mode of operation to required values for the target mode of operation in a map-based pilot control phase;
shifting the mode of operation after the map-based pilot control phase; and
controlling the at least one exhaust gas recirculation and valve drive after the shift.

4. A method according to claim 3, further comprising during a transition from a mode of operation with an externally-supplied ignition to a mode of operation with self-ignition, compensating for an exhaust gas temperature in a combustion chamber of the internal combustion engine such that less residual gas is retained and respectively recirculated.

5. A method according to claim 4, further comprising during the transition phase, opening a throttle valve of the internal combustion engine in order to increase an air quantity, and in that the residual gas quantity is increased during the transition phase.

6. A method according to claim 4, wherein shifting includes deploying a closed loop control of the valve train assembly, a closed loop control of an exhaust gas recirculation, a closed loop control of a throttle valve and a closed loop control of fuel injection.

7. A procedure according to claim 3, further comprising during a transition from a mode of operation with self-ignition to a mode of operation with an externally-supplied ignition, minimizing a residual gas proportion in a cylinder during the map-based pilot control phase or the transitional phase.

8. A method according to claim 7, further comprising closing a throttle valve during the map-based pilot control phase.

9. A method according to claim 7, wherein shifting includes deploying a closed loop control of a valve train assembly, a closed loop control of an exhaust gas recirculation, a closed loop control of a throttle valve, a closed loop control of an ignition, and a closed loop control of a fuel injection.

10. A method according to claim 9, wherein the closed loop controls are cycle-synchronous.

* * * * *